Jan. 20, 1970  L. G. DAWSON ET AL  3,490,472
AIR INTAKE DUCT FOR A GAS TURBINE ENGINE
Filed Jan. 19, 1968

Inventors
LINDSAY GRAHAME DAWSON
DAVID MORRIS BROWN
By
Cushman, Darby & Cushman
Attorneys

United States Patent Office 3,490,472
Patented Jan. 20, 1970

1

3,490,472
AIR INTAKE DUCT FOR A GAS
TURBINE ENGINE
Lindsay Grahame Dawson, Donnington, and David Morris Brown and Donald McLean, Derby, England, assignors to Rolls-Royce Limited, Derby, England, a British company
Filed Jan. 19, 1968, Ser. No. 699,088
Int. Cl. F02c 7/04
U.S. Cl. 137—15.1
5 Claims

ABSTRACT OF THE DISCLOSURE

An air intake duct for a gas turbine engine, having an upstream part which may be moved between a first position, in which there is a gap in the upper part of the air intake duct between the said upstream part and a downstream part of the air intake duct, and a second position in which the gap is closed, and means for opening and closing the said upstream part to flow therethrough.

This invention concerns an air intake duct for a gas turbine engine.

According to the present invention, there is provided an air intake duct for a gas turbine engine, having an upstream part which may be moved axially between a first position, in which there is an annular gap between the said upstream part and a downstream part of the air intake duct, and a second position in which the gap is closed, means for opening and closing the said upstream part to flow therethrough, and screen means for deflecting upwardly noise which would otherwise issue through the lower part of the annular gap when the parts are in the said first position.

Considerable engine noise, produced by the engine compressor, normally escapes through the air intake duct of a gas turbine engine. In the case of the present invention, however, at take-off and landing the means for opening and closing the upstream part of the air intake duct may be arranged to close the latter while the upstream part may be moved to the said position so that noise may be deflected through the upper part of the said gap. Thus, the noise may be attenuated so far as a person situated below the engine is concerned.

The screen means are preferably provided externally of the air inlet duct. At least part of the screen means are preferably spaced or spaceable from the air intake duct. Thus, the screen means may comprise two pivotally mounted part-cylindrical members which are pivotally mounted adjacent to each other so as to be movable between a position in which they lie wholly in contact with the outer surface of the air intake duct and another position in which their outer edges are spaced from the said outer surface.

Alternatively, the said upstream part may be pivotally connected to the said downstream part at the lower part of the air intake duct, so that, in the said first position, the gap does not extend to the lower part of the air intake duct.

The means for opening and closing the said upstream part may comprise two pivotally mounted clamshell doors which are movable between an open position in which they are respectively spaced from each other and are disposed at the upper end and lower parts respectively of the air intake duct, and a closed position in which they engage each other and extend across the air intake duct.

The invention also comprises a gas turbine engine having an air intake duct as set forth above.

The invention is illustrated, merely by way of example, in the accompanying drawings, in which:

2

Figure 1:
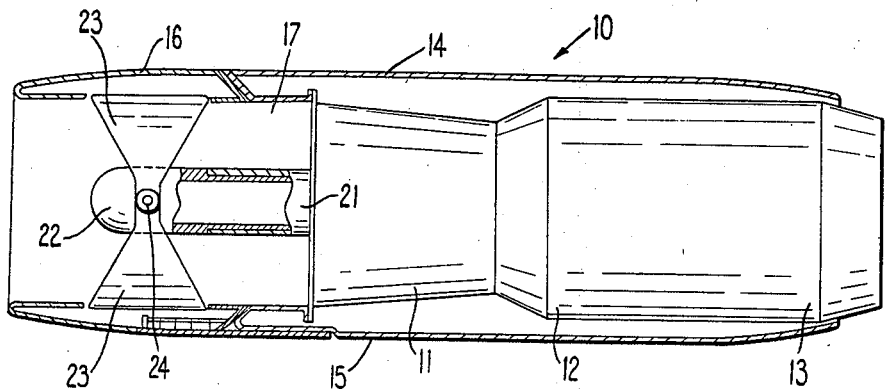
Figure 2:
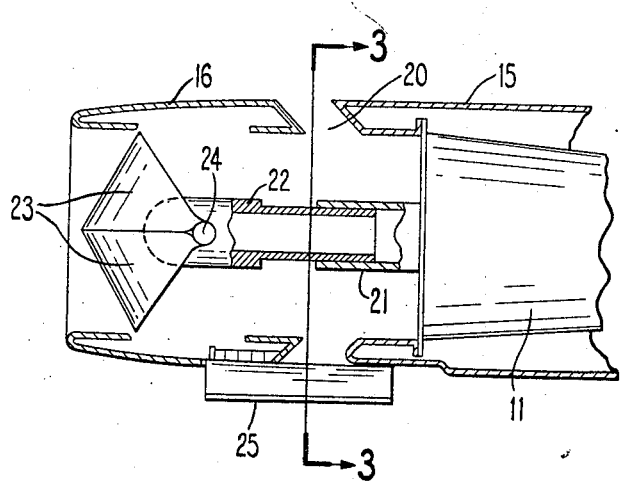
Figure 3:
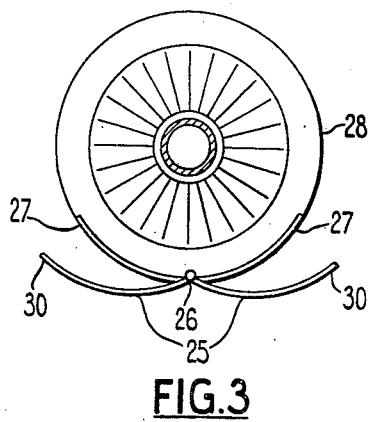

FIGURE 1 is a diagrammatic sectional view of a gas turbine engine provided with an air intake duct according to the present invention, FIGURE 2 is a diagrammatic broken-away view similar to FIGURE 1 but showing the parts thereof in a different position, and FIGURE 3 is a diagrammatic section taken on the lines 3—3 of FIGURE 2.

Referring first to FIGURES 1-3, a gas turbine engine 10, which comprises a compressor 11, combustion equipment 12 and turbine 13, is mounted in a pod 14. The pod 14 has a fixed downstream part 15 and an axially movable upstream part 16. The upstream part 16 and the adjacent portion of the part 15 constitute the wall of an air intake duct 17.

The upstream part 16 is movable between the positions shown in FIGURES 1 and 2. In the FIGURE 2 position, there is an annular gap 20 between the parts 15, 16. In the FIGURE 1 position, however, the parts 15, 16 are in engagement with each other so that the annular gap 20 is completely closed.

A sleeve 21, which is mounted centrally of the air intake duct 17 and is disposed adjacent the downstream end of the latter, is secured to the fixed part 15 of the pod 14. A piston member 22 is slidably mounted in the sleeve 21 and is axially movable therein by means not shown. The piston member 22 carries two clamshell doors 23 which are mounted on a common pivot 24 carried by the piston member 22.

The doors 23 are pivotally movable, by means not shown, between the positions respectively shown in FIGURES 1 and 2. In the FIGURE 1 position, the doors 23 are open so as to permit flow through the upstream part 16. In this position, the doors 23 are respectively spaced from each other and are disposed at the upper and lower parts respectively of the upstream part 16.

In the FIGURE 2 position, however, the doors 23 are closed and engage each other so as to extend across the air intake duct 17 and thus close the latter to flow therethrough.

Two part-cylindrical members 25 are mounted on a common pivot 26 externally of and immediately below the air inlet duct 17. When the parts are in the FIGURE 1 position, in which the parts 15, 16 engage each other and in which the doors 23 are open, the part-cylindrical members 25 are received in recesses 27 in the outer surface 28 of the air inlet duct 17. Accordingly, in the FIGURE 1 position, the part-cylindrical members 25 lie wholly in contact with the outer surface 28. When, however, the parts are in the FIGURE 2 position, in which the parts 15, 16 are spaced from each other by the annular gap 20 and in which the doors 23 are closed, the part-cylindrical members 25 are moved pivotally (by means not shown) to a position in which their outer edges 30 are spaced from the outer surface 28 of the air inlet duct 17.

When an aircraft in which the engine 10 is installed is in flight, the parts are arranged as shown in FIGURE 1, with the result that the engine has, in effect, a conventional air intake duct in which there is, at this time, no annular gap 20, the doors 23 being open.

At take-off and landing, however, the parts are arranged as shown in FIGURE 2. In this position, the doors 23 tend to prevent compressor noise from being transmitted upstream, while the part-cylindrical members 25 act as a screen which attenuates the noise so far as a person vertically beneath the engine is concerned. The air required by the compressor 11 is at this time drawn in through the annular gap 20, the compressor noise being deflected at this time by the part-cylindrical members 25 through the upper part of the annular gap 20.

We claim:
1. An air intake duct for a gas turbine engine comprising:
   an upstream part and a downstream part, said upstream part and said downstream part being movable axially relative to each other between a first position defining an annular gap therebetween in the air intake duct and a second position closing said annular gap;
   means operable to open and close said upstream part to flow therethrough, said upstream part being closed and opened when said parts are in said first position and said second position respectively; and
   screen means for deflecting upwardly noise which would otherwise issue through the lower part of said annular gap when the upstream part and said downstream part are in said first position.

2. An air intake duct as claimed in claim 1 in which the screen means are provided externally of the air inlet duct.

3. An air intake duct as claimed in claim 2 in which at least part of the screen means is at least spaceable from the air intake duct when said upstream part is in said first position.

4. An air intake duct as claimed in claim 3 in which the screen means comprise two pivotally mounted part-cylindrical members which are pivotally mounted adjacent to each other so as to be movable between a position in which they lie wholly in contact with the outer surface of the air intake duct and another position in which their outer edges are spaced from the said outer surface.

5. An air intake duct as claimed in claim 1 in which the means for opening and closing the said upstream part comprises two pivotally mounted clamshell doors which are movable between an open position in which they are respectively spaced from each other and are disposed at the upper and lower parts respectively of the air intake duct, and a closed position in which they engage each other and extend across the air intake duct.

References Cited

UNITED STATES PATENTS

| | | | |
|---|---|---|---|
| 2,848,181 | 8/1958 | Landers | 137—15.1 XR |
| 3,036,429 | 5/1962 | Schairer | 137—15.1 XR |
| 3,347,496 | 10/1967 | Opfer | 137—15.1 XR |

ROBERT G. NILSON, Primary Examiner